US008510716B1

(12) United States Patent
Jakubiak et al.

(10) Patent No.: US 8,510,716 B1
(45) Date of Patent: Aug. 13, 2013

(54) SYSTEM AND METHOD FOR SIMULTANEOUSLY VALIDATING A CLIENT/SERVER APPLICATION FROM THE CLIENT SIDE AND FROM THE SERVER SIDE

(75) Inventors: Nathan Michael Jakubiak, Pasadena, CA (US); Jeehong Min, Pasadena, CA (US)

(73) Assignee: Parasoft Corporation, Monrovia, CA (US)

( * ) Notice: Subject to any disclaimer, the term of this patent is extended or adjusted under 35 U.S.C. 154(b) by 1468 days.

(21) Appl. No.: 11/940,060

(22) Filed: Nov. 14, 2007

Related U.S. Application Data

(60) Provisional application No. 60/865,768, filed on Nov. 14, 2006.

(51) Int. Cl.
*G06F 9/44* (2006.01)
*G06F 11/00* (2006.01)

(52) U.S. Cl.
USPC .............................. 717/126; 717/132; 714/45

(58) Field of Classification Search
None
See application file for complete search history.

(56) References Cited

U.S. PATENT DOCUMENTS

| | | | | |
|---|---|---|---|---|
| 5,371,883 A | * | 12/1994 | Gross et al. | 714/38.1 |
| 5,634,098 A | * | 5/1997 | Janniro et al. | 714/38.1 |
| 6,587,969 B1 | * | 7/2003 | Weinberg et al. | 714/46 |
| 6,889,158 B2 | * | 5/2005 | Penov et al. | 702/119 |
| 7,392,507 B2 | * | 6/2008 | Kolawa et al. | 717/124 |
| 7,401,143 B2 | * | 7/2008 | Oulu et al. | 709/224 |
| 7,490,319 B2 | * | 2/2009 | Blackwell et al. | 717/124 |
| 7,707,557 B1 | * | 4/2010 | Nikolov | 717/130 |
| 7,721,154 B1 | * | 5/2010 | Jaamour et al. | 714/38.14 |
| 7,908,590 B1 | * | 3/2011 | Min et al. | 717/124 |
| 7,996,817 B1 | * | 8/2011 | Wen | 717/124 |
| 8,001,532 B1 | * | 8/2011 | Jakubiak et al. | 717/125 |
| 2002/0066077 A1 | * | 5/2002 | Leung | 717/126 |
| 2003/0093717 A1 | * | 5/2003 | Mason | 714/38 |
| 2004/0215762 A1 | * | 10/2004 | Oulu et al. | 709/223 |
| 2006/0230320 A1 | * | 10/2006 | Salvador et al. | 714/38 |
| 2006/0288256 A1 | * | 12/2006 | Mathew et al. | 714/38 |
| 2007/0240127 A1 | * | 10/2007 | Roques et al. | 717/136 |

OTHER PUBLICATIONS

Bellettini, C., et al., "TestUML: User-Metrics Driven Web Applications Testing", Proceedings of the 2005 ACM Symposium on Applied Computing [online], 2005 [retrieved May 10, 2013], Retrieved from Internet:<http://dl.acm.org/citation.cfm?id=1067060>, pp. 1694-1698.*

* cited by examiner

*Primary Examiner* — Don Wong
*Assistant Examiner* — Todd Aguilera
(74) *Attorney, Agent, or Firm* — Christie, Parker & Hale, LLP

(57) ABSTRACT

A system and method for simultaneously validating a client-server software application from a client side and a server side, the client-server software application having a client application and a server application. The method and system include: defining a test case to exercise or emulate the client application; specifying validations to be made against server-side state in the defined test case; controlling a monitoring program to monitor the server application and collect information about the server-side state; executing the defined test case to exercise the server application through the client or a client emulator; processing the collected information; simultaneously performing validation tests against the collected information about the server-side state and against the client application or outputs from the server; and reporting results of the validation tests.

11 Claims, 6 Drawing Sheets

FIG. 5

```
public void testPatentSearchTest() throws Exception {
    // Access the monitoring engine -
    // Initialization happens prior to this test being run
    MonitoringEngine engine = MonitoringEngine.getEngine();                              — 502

// Set the scope of monitoring -
    // Monitor all calls to the com.google.search package
    String[] scope = new String[] { "com.google.search" };                               — 503
    engine.setMonitoringScope(scope);

long startTime = System.currentTimeMillis();
    WebConversation wc = new WebConversation();

// User Action #1 - Navigate to google start page
    WebRequest req = new GetMethodWebRequest("http://www.google.com/");
    WebResponse resp = wc.getResponse(req);                                              — 504

// User Action #2 - Type "patent" query into search box
    WebForm form = resp.getFormWithName("f");
    form.getScriptableObject().set("q", "patent");

// User Action #3 - Click submit button
    SubmitButton button = form.getSubmitButton("btnG");
    resp = form.submit(button);

Document doc = resp.getDOM();
    Element allResultsDiv = (Element) doc.getElementById("res");
    Element mainResultsDiv =
        (Element) allResultsDiv.getElementsByTagName("div").item(1);                    — 505

// Validation against server-returned output -
    // Verify there are 10 search results
    NodeList anchorTags = mainResultsDiv.getElementsByTagName("a");
    assertEquals(10, anchorTags.getLength());

// Retrieve all com.google.search.SearchResultList
    // objects created on the server while
    // the user actions were being executed.
    // These objects are not the same instances,
    // but are recreated instances that have the                                         — 506
    // same properties as the actual instances
    // had in the server application.
    long endTime = System.currentTimeMillis();
    Object[] listObjects = engine.getRecreatedObjects(
        SearchResultList.class, startTime, endTime);

// Validate server-side state - Validate that only
    // one SearchResultList object was created as this
    // page was executed. More than one would be a bug.
    // It would be impossible to validate this only from
    // the client-side.
    assertEquals(1, listObjects.length);

SearchResultList list = (SearchResultList) listObjects[0];
    SearchResultEntry[] entries = list.getEntries();                                     — 507

// Validate server-side state - Validate that the
    // SearchResultList had 10 search results.
    // These correspond to the same 10 search
    // results we verified in the server output above.
    // We have now verified that the server output as
    // well as the server-side state had correct values.
    assertEquals(10, entries.length);
```

SYSTEM AND METHOD FOR SIMULTANEOUSLY VALIDATING A CLIENT/SERVER APPLICATION FROM THE CLIENT SIDE AND FROM THE SERVER SIDE

CROSS-REFERENCE TO RELATED APPLICATION(S)

This Patent Application claims the benefit of the filing date of U.S. Provisional Patent Application Ser. No. 60/865,768, filed on Nov. 14, 2006 and entitled "System And Method For Creating Test Cases For Simultaneously Validating A Client/Server Application From The Client Side And From The Server Side," the entire content of which is hereby expressly incorporated by reference.

FIELD OF THE INVENTION

The present invention relates generally to testing computer software; and more particularly to a system and method for simultaneously validating a client/server application.

BACKGROUND

Traditionally client-server applications have been tested in one of the following ways. First, a test tool exercises a client and validates that the client responds properly to user inputs. The behavior of the server is indirectly tested by validating the correct behavior of the client, since the server output affects what the client displays to the user. In this scenario both the behavior of the client application and the server application are being tested. An example is a test tool that is used to automate testing of a Java client or of a web browser.

Second, instead of testing a client application directly, a test tool can emulate a client by directly interacting with the server and acting like a client. However, in these cases, a client application is not being tested. Instead, the behavior of the server is tested by the test tool sending different requests or sequences of requests to the server and then validating the contents of the responses returned by the server.

Another way that client-server applications are tested is by using unit tests that run against the server-side code. In this case, the tests are not run in the server's runtime environment rather, they are simply unit tests that run against the application code. They typically require that many method calls be stubbed out, since the test cases are not run against a running web application, but only against the source code of the application.

An adaptation of this method is to use unit tests that run in-container. In-container tests require that the server application be running as the tests are run. Typically they involve executing the test case to make special requests to the server and adding in or turning on an additional server framework that intercepts the special server requests. The special requests may include parameters that are only intended to be used by the additional server framework. However, since the tests are performed using the additional framework and not using typical client requests, the behavior of the server is not tested in the actual production environment in which it needs to be run. Additionally, the framework requires the setup work of installing and configuring it.

The first two methods of testing are performed from the client side of the application, without directly validating the server as it runs. The server is tested by observing its output, either within a client or within the output itself. The third method (along with its adaptation) is performed from "inside" the server, without doing any validation on the output it produces for the client. Using the first three methods, if a user desires to test both client-side and server-side behavior, he needs to run different tests at different times in order to accomplish this.

The separation of client and server-based tests is undesirable in many cases. Server applications are meant to be accessed through a remote client. Therefore, it is understandably difficult to create tests that run against the server in the server's runtime environment without using a client to send requests to the server. It can be difficult or even impossible to replicate the server state, thus making validation just as difficult. On the other hand, simply validating server output from the client perspective is not a sufficient method of testing either, as there may be problems in the server application that do not make themselves visible in the output.

Therefore, there is a need for a new system and method to define a test case that exercises the server from the client perspective, without modifying the server's environment, and at the same time is able to validate server-side state to validate whether the server is operating properly.

SUMMARY

In some embodiments, the present invention is a system and method for simultaneously validating a client-server software application from a client side and a server side, the client-server software application having a client application and a server application. The method and system include: defining a test case to exercise or emulate the client application; specifying validations to be made against server-side state in the defined test case; controlling a monitoring program to monitor the server application and collect information about the server-side state; executing the defined test case to exercise the server application through the client or a client emulator; processing the collected information; simultaneously performing validation tests against the collected information about the server-side state and against the client application or outputs from the server; and reporting results of the validation tests.

Defining the test case may include generating corresponding code (for example, JAVA code) from an Application Programming Interface (API) (for example a HttpUnit API) that mimics a set of user actions in the client application or by a client emulator.

BRIEF DESCRIPTION OF THE DRAWINGS

FIG. 5 is an exemplary source code based test case, according to some embodiments of the present invention.

DETAILED DESCRIPTION

In some embodiments, the present invention is a system and method for simultaneously validating an application from the client side and the server side. The invention allows the user to define a test in a client-server application using, for example, a test tool. The test tool controls a client or emulates a client to test both or one of the client and server applications.

Figure 1:
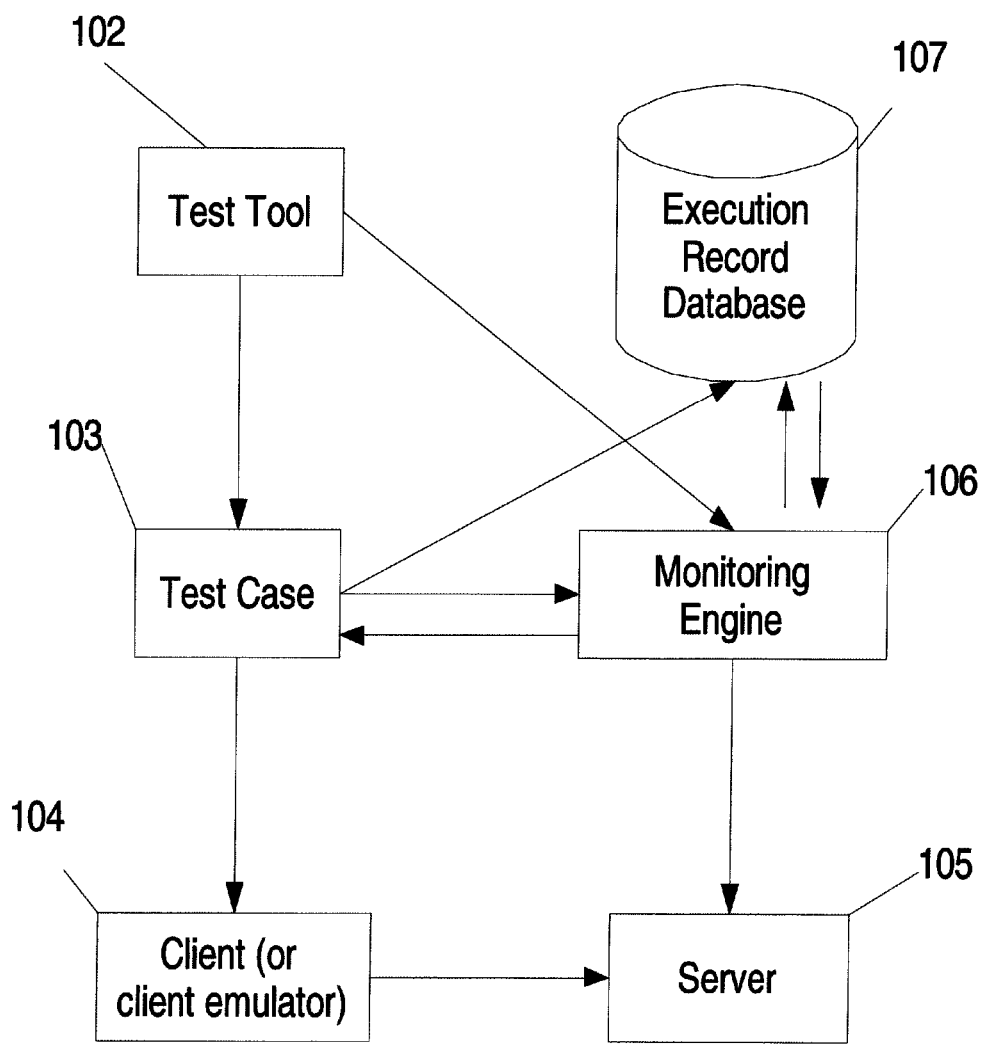
FIG. 1 is an exemplary block diagram of a test environment, according to some embodiments of the present invention.

FIG. 1 is an exemplary block diagram of the test environment, according to one embodiment of the present invention. In some embodiments, the invention uses a test tool 102 to define and/or execute a test case 103. The test case includes a set of actions to perform in a client application 104 (or within an emulator that emulates a client application) that interacts with a server application 105. The test tool and/or test case interact with a monitoring engine (program) 106 that monitors the server application as the test case is executed and collects information about the state of the server application. The collected information is stored in an execution record database 107. The executing test case can then access the information from the execution record database directly or though the monitoring engine. The test case may define validations to make against the monitored information.

Figure 4:
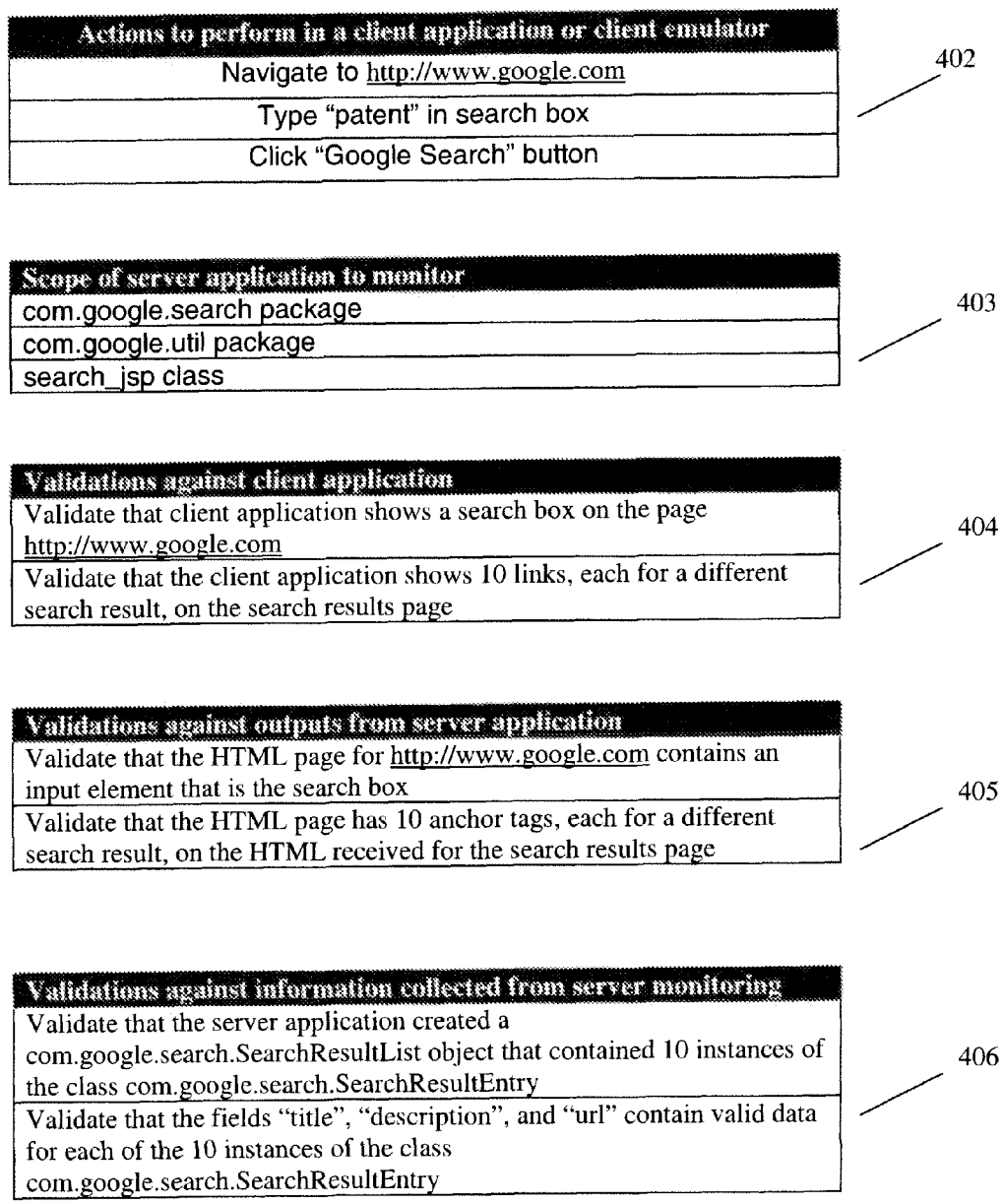
FIG. 4 is an exemplary block diagram of some elements of a test case, according to some embodiments of the present invention.

FIG. 4 is an exemplary block diagram of some elements of a test case, including possible examples for each of those elements, according to one embodiment of the present invention. The test case specifies a set of actions 402 to be performed within either a client application or a program emulating a client application. The test case may optionally specify a scope of a server application to monitor 403. An example of the scope may include specific source code modules, packages, and/or files that are expected to be accessed within the server application when the test case is executed. These elements are expected to be related to the specific server functionality to be tested within the test case.

The test case also specifies validations to be made against the client application 404 and/or validations to be made against the output(s) from the server application 405. For example, validations against the client application may include validating that the client shows appropriate information to the user, for example, that a search field that allows a user to enter search criteria shows up on a search page. In another example, validations against the outputs from a server application may include validating that HTML returned by the server application contains an input element that allows a user to enter search criteria on a search page in a client that interprets the HTML. A primary difference between validating a client application and validating the outputs from a server application is as follows. When validating a client application, direct validation is made that the client shows the appropriate information (for example, a search box) based on the output(s) received from the server (for example, an HTML file containing an input element). In this situation, the server output is only indirectly tested (for example, the client application will not create a search box if the input element is not in the HTML). However, validating server output(s) involves directly testing the output(s) from the server, for example that an input element is present in the HTML for a search page.

Lastly, the test case specifies validations to make against information collected from server monitoring 406. For example, the test case can retrieve information about the state of a server-side object of type "com.google.search.SearchResultsList" that is present within the server application as the test case executes. The test case can validate that the state of that object meets certain requirements for this particular test case, for example, whether the object contains 10 instances of the class "com.google.search.SearchResultEntry" and whether the states of each of those instances are correct and contain proper information within their "title", "description", and "url" fields.

Figure 2:
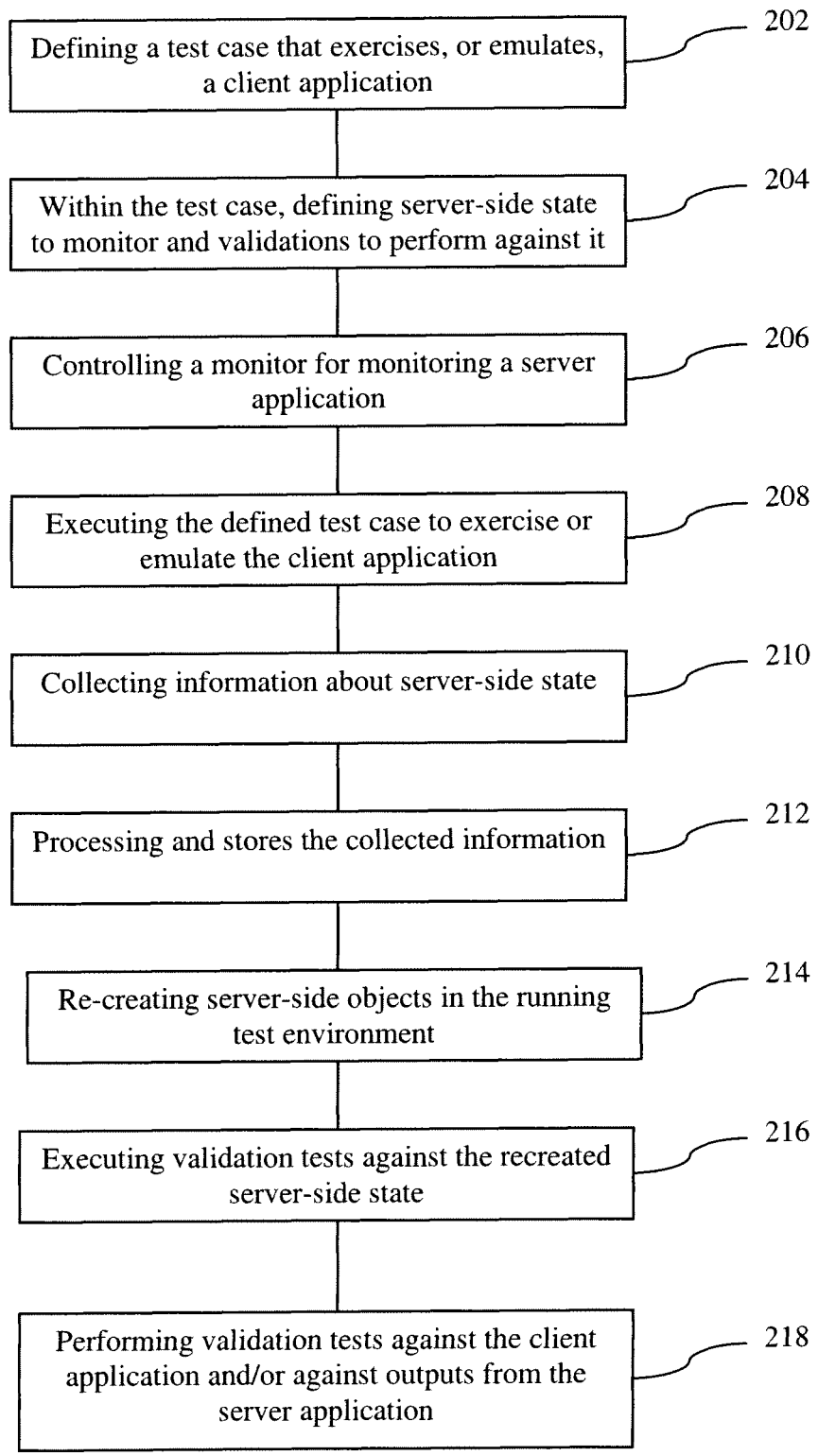
FIG. 2 is an exemplary process flow for defining and executing a test case that simultaneously validates client-side and server-side information, according to some embodiments of the present invention.

FIG. 2 is an exemplary process flow, for defining and executing a test case that simultaneously validates client-side and server-side information, according to one embodiment of the present invention. The invention allows a user to define a test case that exercises or emulates a client application, as shown in block 202. Within the same test case, a user also defines portions of a server application to monitor, along with validations to make against server-side state that will be monitored as the test case executes, in block 204. Some examples of these validations are given in FIG. 4. In block 206, the invention controls a monitoring program that monitors the server application (which may include sending information to the monitoring program about what portions of the server application to monitor), and in block 208, the invention executes the defined test case, which in turn exercises or emulates the client application. In block 210, the monitoring program monitors the execution of the server application and collects information about server-side state, such as, the execution paths of the server application. In one embodiment, the monitoring program profiles interfaces available for a given program type to provide data about method invocation sequence and argument values. For instance, the monitoring program may observe that one instance of an object of type "com.google.search.SearchResultsList" was created by the server application while it constructed a search results page to send to a client application. Furthermore, the monitoring program may also observe that a method in that object called "addSearchEntry" was called 10 times in the course of the test case execution. The monitoring program may then process and store the collected information to be retrieved later by the executing test case, as seen in block 212.

The collected information may include data uniquely identifying a thread in the execution path in which a method is invoked, instance object on which the method was invoked, method argument values, place of the method invocation amongst other method invocations, and return value of the methods. The collected information may also include information about the objects and processes a method would interact with, and objects calling sequence, which may be implied from temporal recording of sequence of calls from the execution of application program (while exercised by the client application or the client emulator).

The invention then retrieves the collected information about server-side state that was stored by the monitoring program, and uses it to recreate instances of the server-side objects in the testing environment that have the same properties as the actual objects had in the server application, as seen in block 214. It recreates the objects by using an API exposed by the invention that allows it to instantiate the objects, set object properties, and stub portions of the object that reference information that was not collected by the monitoring engine. Validation tests are then run against the server-side state, in block 216. For example, if the server contains a particular object with certain values, the test validates that the object did in fact exist and had the correct values, as the client accessed the application.

Optionally and in addition to validating the server-side state, the test case may also perforin validations against the behavior of the client or the output from the server, as shown in block 218.

Figure 3:
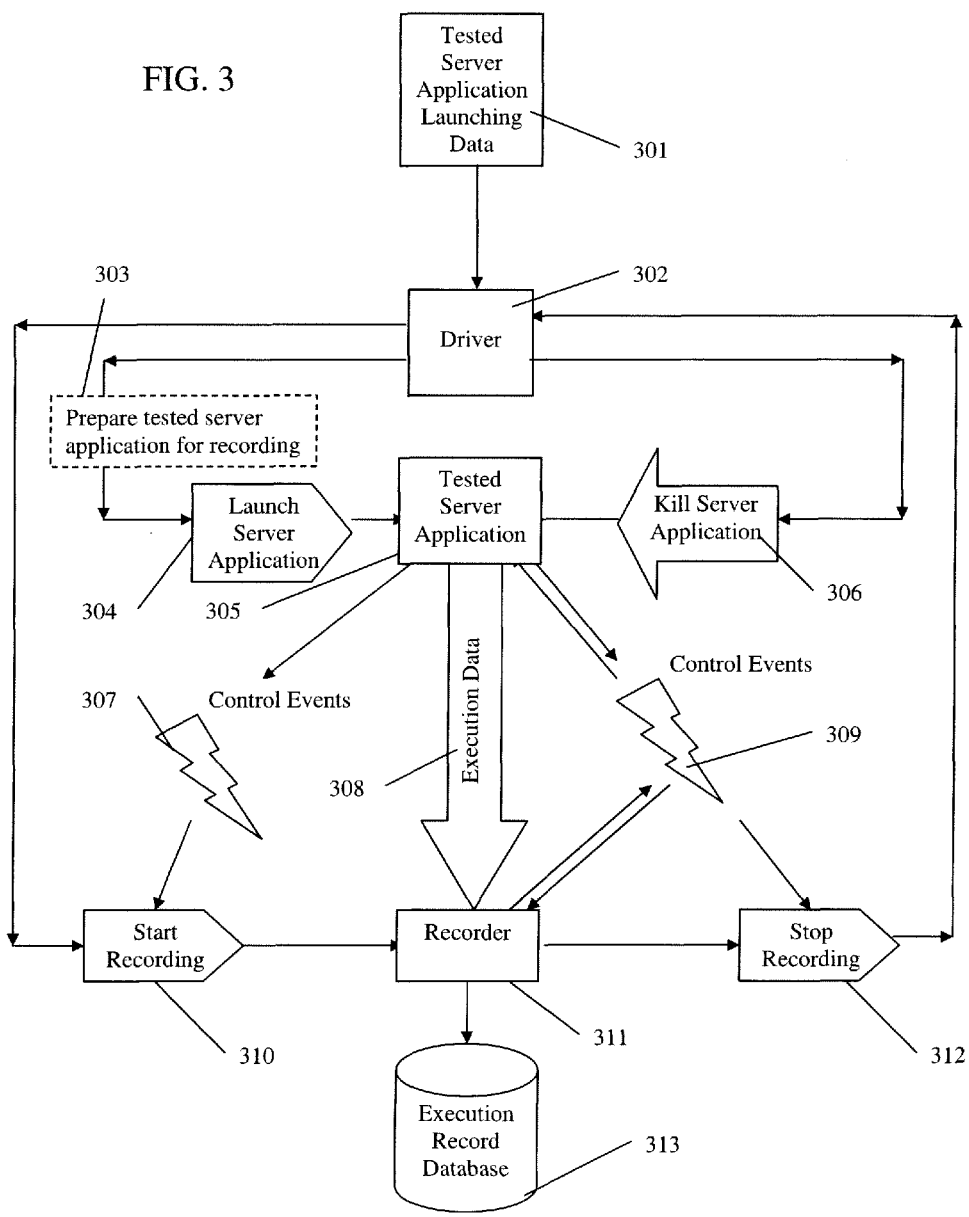
FIG. 3 is an exemplary block diagram for monitoring execution of a server application and recording execution data, according to some embodiments of the present invention.

FIG. 3 is an exemplary block diagram for monitoring execution of a server application, for example a web application, and recording execution data, according to one embodiment of the present invention. A driver program 302 is launched with a Tested Server Application Launching Data 301. This data describes to a driver, for example, a remote client 302 how to set the environment and what parameters to pass to the tested server application. The tested server application is prepared for recording (303) by enabling the runtime system and providing runtime program information required to record program stats. This may be done, for example, by instrumenting source or binary code of the tested server application, by enabling debugging interfaces of the program type to access runtime values, profiling interfaces available for the given program type of the server application for notification of runtime events, or by using a combination of the above. The server application may be prepared, for example, before launching, while it is being loaded into the memory, or when a particular part of the application is about to be executed.

For example, data can be acquired for processes run on Java VM using Debugger Interface (DI), Profiler Interface (PI), or Tool Interface (TI) for Sun Microsystem's™ Java Development Kit™ (JDK). Alternatively, the source or the binary code can be instrumented. Also, the combination of the above mentioned data acquisition means can be employed. Such profiling interfaces provide data about method invocation sequence and argument values. For Java applications, these interfaces are known as Java Virtual Machine Profiler Interface (JVMPI), Java Virtual Machine Debugger Interface (JVMDI), and Java Virtual Machine Tools Interface (JVMTI).

The driver program then initializes a recorder module 311. Control events 307 and 309 are sent to the recorder. These events may be sent by the driver 302, the monitored server application, or both. Example of control events include, "Start Recording" 310, and "Stop Recording" 312. Events also control the granularity of recorded data. For example, "Record method calls", "Record method calls and objects", etc. Execution data 308 is then sent to the recorder 311.

Recorder 311 may send control events to the monitored server application 305 or the driver 302. These events may be, for example, data granularity control events like, turning on/off object recording, execution control events like, "suspend execution" or "kill". Execution data is then processed by the recorder and stored in an Execution Record Database 312. The tested program is prepared for recording (303) by appending arguments for the launch to enable the required program type interfaces. The prepared program is then launched in 304, and terminated in 306.

A monitoring program is described in more detail in a co-pending and co-owned U.S. patent application Ser. No. 11/559,356, and entitled "System And Method For Automatically Creating Test Cases Through a Remote Client,", now U.S. Pat. No. 7,908,590, the entire contents of which is herein incorporated fully by reference.

In some embodiments, the present invention defines the test case within a unit test written with a programming language. For example, an API is defined to allow connection to the server-side monitor, retrieval of the monitored data, and re-creation of server-side objects within the test case so that assertions can be defined against those objects. A user defines a series of user actions that are to be performed in an application being tested. These user actions represent the real steps a user would take within a client application when interacting with the remote application. Each user action may cause a series of requests to be made to the server application. Each request may be an HTTP request, where the HTTP headers, the URL being requested, and the post data being sent along with the request may also be able to be modified by the user within the unit test.

The test case may also perform validations against the client or against the output from the server. The test case may also retrieve recreated server-side objects from the server-side monitor, and define assertions against properties of those objects. These recreated server-side objects are replicas of object instances that were detected by the monitor while the test case was executing the user actions. The monitor observes the objects in the server application, records the data needed to recreate them, and then when asked by the test case, recreates the same objects with the same properties in the test environment.

Defining the test case within source code typically provides more flexibility to the user than defining the test case within a test tool. Source code generally allows the test case to be created with much more complicated logic than could be done in a GUI. Server-side objects are abstractions of real-world data that are defined within source code; therefore, it is a natural extension to use a source code-based unit test to validate them. Typically, only developers understand the architecture of the server sufficiently to know what objects to expect and what their values should be. Since the developers already understand and like working with source code, it is advantageous for the tests to be written in source code.

FIG. 5 is an exemplary source code based test case, according to one embodiment of the present invention. The test case accesses the monitoring engine in block 502, using an API which has been defined to access it. The engine may have already been initialized before this test case started running. In block 503, the test case tells the monitoring engine to monitor execution information for code in the package com.google.search, since the test case will later define validations for runtime instances of objects in that package. The test case then uses the HttpUnit Application Programming Interface (API) to execute a series of user actions that navigate to the google home page, type in a search term, and click the submit button to retrieve the search results, as seen in block 504. The HttpUnit API is a client emulator. In block 505, the test case validates the output from the server. In this case it uses the HttpUnit API to get a parsed representation of the HTML output from the server application, and then it uses other Java-based APIs to validate that the output contains 10 links, each one corresponding to one of the 10 search results on the search results page returned by the server.

In block 506, the test case again accesses the monitoring engine, this time asking it for a recreated instance of every object of type "com.google.search.SearchResultList" that was created by the server application during the time the user actions were being executed by the test case. In this example "SearchResultList" is a Java class used by the server application when it constructs search results in HTML to send to the client application. The monitoring engine (program) recreates instances of the objects based on the information it collected while monitoring the state of those objects on the server, and returns those recreated instances to the test case.

In block 507, the test case validates that only one instance of the "SearchResultList" object was created by the server application while the user actions were executed, and furthermore validates that that one object contains 10 instances of the "SearchResultEntry" object, since a search results page is expected to have 10 results. The test case may then define assertions against properties of each of the "SearchResultEntry" objects, for example, verifying that each one contains a non-empty description, title, and URL.

In some embodiments, the present invention automatically creates the test case by iterating through a set of user actions previously recorded in a browser one by one (i.e. clicking a link, submitting a form, sending a custom request, etc.), and then generates corresponding code, for instance, Java code from the HttpUnit Application Programming Interface (API) that mimics each action. The Java source code fragments for each action are combined into a test case that executes the actions in the same order as they were made while recording in the browser.

For example, a set of user actions performed within a browser accessing a remote server application (such as a web application) are converted into a test (for example, a JUnit test) that uses the HttpUnit API to define the same set of user actions. These user actions may have been recorded within the context of a test tool that also allows a user to set up validations against the client application and/or the server outputs within the test tool GUI. These validations that were set up within the tool GUI may also be automatically transferred to the generated JUnit test. To do this, the invention iterates through each validation one by one and then generates corresponding Java code from the HttpUnit and JUnit APIs that will mimic the same validation.

Optionally, instead of or in addition to the user defining the server-side-object assertions, a test tool with a GUI may generate them automatically. For example, this could happen by the test tool observing the server-side objects that were created by a server application while recording user actions in a browser. Once done recording, in addition to generating the code within the test case that executes the recorded user actions, the test tool could also generate assertions within the test case for recreated versions of the server-side objects it observed while recording.

Generation of a unit test written with a programming language is described in more detail in a co-pending and co-owned U.S. patent application Ser. No. 11/558,241, and entitled "System And Method For Generating Source Code-based Test Cases," the entire contents of which is herein incorporated fully by reference.

Figure 6:
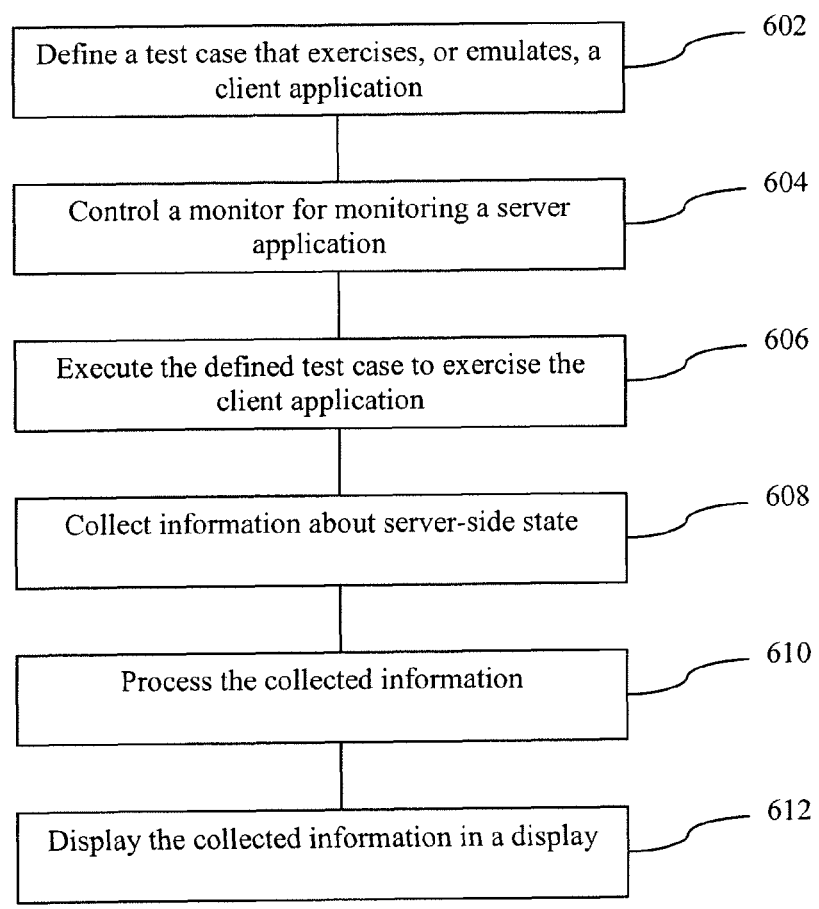
FIG. 6 is an exemplary process flow for collecting and displaying information about server-side state while exercising a client application for trouble-shooting, according to some embodiments of the present invention.

FIG. 6 is an exemplary process flow for collecting and displaying information about server-side state while exercising a client application for trouble-shooting, according to one embodiment of the present invention. In one embodiment, instead of, or in addition to, using server-side state information for validation, the invention uses the state information for trouble-shooting. In block 602, a user uses a test tool to define a test case that exercises or emulates a client application. Then, in block 604, the user controls a monitor that monitors a server application that will be accessed as the test case runs. For example, a user could specify, in the test tool, what portions of the server application she would like to monitor (for example, a set of source code modules or packages).

Then, as the invention accesses the server application indirectly by interacting with the client application or client emulator in block 606, it collects the server-side information using the monitor in block 608 and processes the collected information in block 610. It then presents it to the user within a GUI in block 612. The user is then able to sift through the presented data, filter it, and observe the recorded state of server-side data. If the user knows that there is a certain problem within an application, the user can record the scenario that reproduces the problem using the present invention. Then the tool that records the scenario would retrieve and show the server-side object state, observed while running the recorded scenario, specified by the user. The user can then peruse the information to identify what objects may have had incorrect values and caused the problem. This is easier than modifying server-side code to log data, which may involve stopping and restarting the server with each change and then replaying the scenario. The invention allows the above-mentioned steps to be performed within the context of the test tool, making the task much easier for the developer.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for simultaneously validating a client-server software application from a client side and a server side, the client-server software application having a client application and a server application, the method comprising:
    defining a test case to exercise or emulate the client application;
    specifying validations to be made against the client application or outputs from the server in the defined test case;
    executing the defined test case to exercise the server application through the client application or a client emulator;
    controlling a monitoring program to monitor the server application while being exercised by the execution of the defined test case, and collect information about server-side internal states including execution paths of the server application, wherein the collected information further includes information about an object calling sequence implied from temporal recording of a sequence of calls from the execution of the server application program being exercised by the client application or the emulator;
    processing the collected information about the server-side internal states;
    retrieving a portion of the processed collected information to recreate instances of server-side objects that have the same properties as the objects in the server application by stubbing portions of the objects that reference information that was not collected by the monitoring program;
    defining assertions against properties of said recreated instances of server-side objects, by the test case;
    simultaneously performing validation tests against the collected information about the server-side internal states and against the client application using the recreated instances of server-side objects; and
    reporting results of the validation tests.

2. The method of claim 1, wherein controlling a monitoring program to monitor the server application and collect information about the server-side internal states further comprises profiling interfaces available for a given program type to provide data about method invocation sequence and argument values.

3. The method of claim 1, wherein defining a test case further comprises using a test tool to define the test case.

4. The method of claim 1, wherein defining a test case further comprises generating corresponding code from an Application Programming Interface (API) that mimics a set of user actions in the client application or by a client emulator.

5. The method of claim 4, wherein the set of user actions are previously recorded in a browser.

6. The method of claim 4, wherein the generated corresponding code is Java code and the API is a HttpUnit API.

7. The method of claim 1, wherein the collected information includes data uniquely identifying a thread in an execution path in which a method is invoked, instance object on which the method was invoked, method argument values, place of the method invocation amongst other method invocations, and return value of the method.

8. The method of claim 7, wherein the collected information further includes information about objects and processes the method would interact with.

9. The method of claim 1, wherein defining a test case further comprises specifying validations to perform on properties of some of the created objects.

10. The method of claim 1, further comprising using the server-side internal states information for trouble-shooting.

11. The method of claim 10, wherein using the server-side internal states information for trouble-shooting further comprises:

specifying portions of the server application to be monitored; and displaying the collected information in a display.

* * * * *